May 8, 1962     P. L. WHITEHEAD     3,033,017
METHOD OF AND APPARATUS FOR MATERIAL TESTING
Filed Sept. 17, 1958
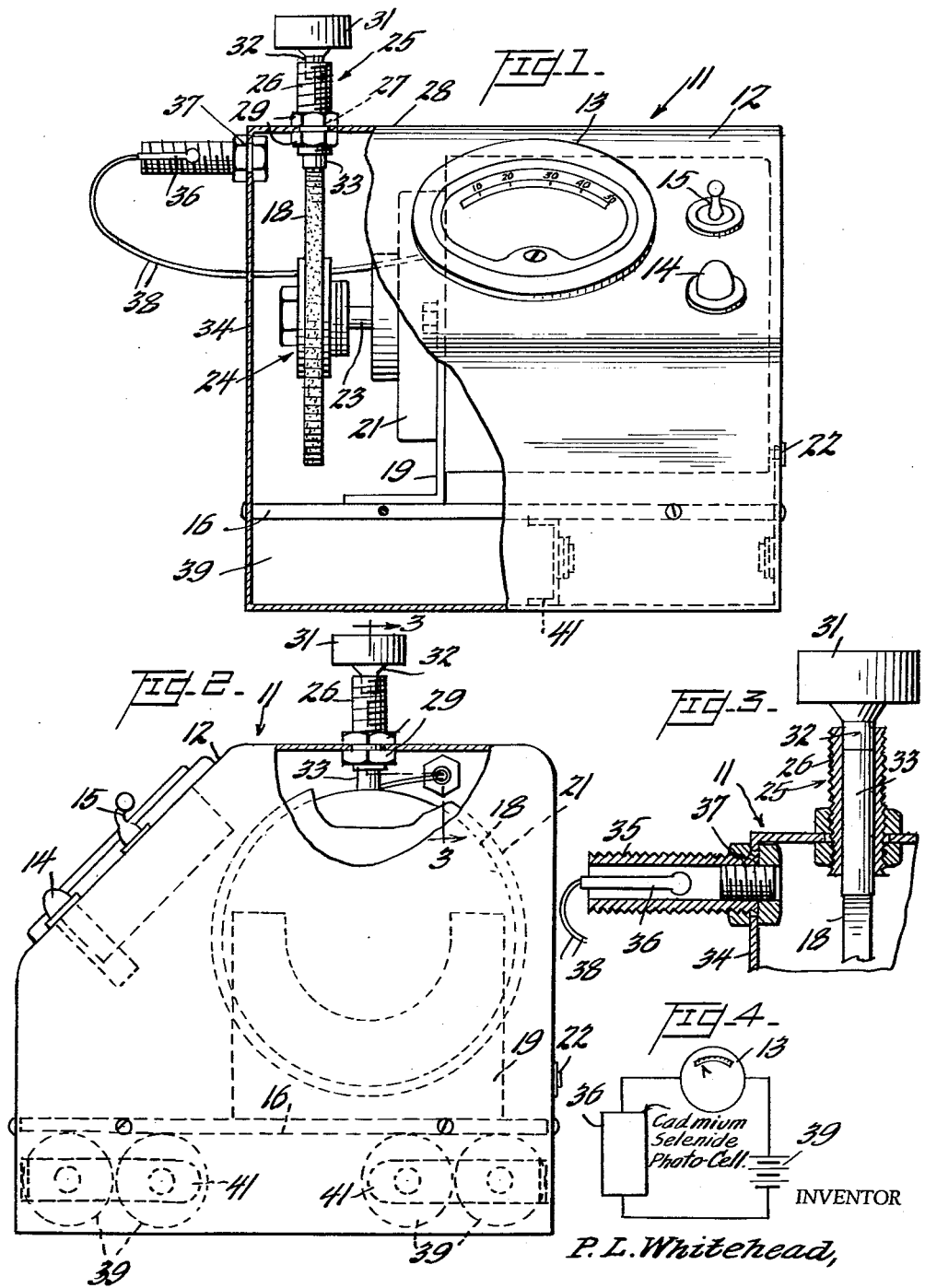
INVENTOR
P. L. Whitehead,
BY C. B. Hamilton,
ATTORNEY United States Patent Office 3,033,017
Patented May 8, 1962

3,033,017
METHOD OF AND APPARATUS FOR MATERIAL TESTING
Paul L. Whitehead, Burlington, N.C., assignor to Western Electric Company, Incorporated, New York, N.Y., a corporation of New York
Filed Sept. 17, 1958, Ser. No. 761,506
3 Claims. (Cl. 73—7)

The present invention relates to a method of and apparatus for material testing and more particularly to a method of and apparatus for identifying steels.

The technique of visual observation of a spark stream in the qualitative analysis of steel samples has been practiced by causing an abrasive wheel to contact a piece of steel, and observing the characteristic patterns of incandescent particles torn loose from the sample. The carbon in a spark particle is oxidized while the particle is incandescent and burns to carbon dioxide. The carbon dioxide gas thus created causes the spark particle to explode, and to deviate from a trajectory known as a "carrier line." It is in this manner that the spark picture presented by different steel varies with the respective carbon content of the steels under test. It has been found that visual observations of spark patterns are not entirely reliable due to the interposition of human variations and errors in judgment.

An object of the present invention is the provision of material testing apparatus.

Another object is to provide a spark test set for identifying steels having an electrical meter circuitry responsive to a light-sensitive device.

A further object of the invention is the provision of a test set for electrically recording the light intensity of a spark path created by the contact of an abrasive wheel with a steel sample.

A method illustrating certain features of the invention may include abrading a sample to create luminary particles, sensing the light intensity of luminescence of the particles, and measuring the sensed light intensity of luminescence to determine the composition of the sample.

Apparatus illustrating certain features of the invention may include abrasive means, sample holding means positioned to bring a test sample into contact with the abrasive means whereby particles are abraded from the surface of the test sample, and sensing means located in the proximity of the contact of the abrasive means with a sample for measuring the intensity of light emitted by the particles.

A complete understanding of the invention may be had from the following detailed description of apparatus forming a specific embodiment thereof, when read in conjunction with the appended drawings, wherein:

FIG. 1 shows a front elevational view of the apparatus with parts thereof broken away for clarity;

FIG. 2 is a side elevational view of the apparatus shown in FIG. 1, partly broken away for clarity;

FIG. 3 is an enlarged fragmentary vertical sectional view taken on the line 3—3 of FIG. 2 looking in the direction of the arrows; and FIG. 4 is a diagrammatic view of the light-sensitive circuitry of a portion of the device.

Referring now to the drawing, and in particular to FIGS. 1 and 2, apparatus illlustrating a specific embodiment of the invention includes a housing 11, which preferably should be light tight. The housing 11 has a curved front panel 12 which supportingly positions an electrical meter 13, such as an ammeter or voltmeter which may be responsive to electrical quantities of a very low order. The meter 13 is connected in an electrical circuit, which is to be explained hereinafter, and is depicted in this circuit as a commercially available meter such as a direct current meter. Also supported in the panel 12 in aperture mounts or the like are spaced an indicator lamp 14 and an electrical toggle switch 15 wired in circuits to be explained hereinafter.

A chassis 16 is disposed by suitable fasteners vertically above the bottom 17 of the housing 11, and attached to this chassis 16 is a motor driven abrasive wheel 18. Motor brackets 19—19 fasten firmly to the chassis 16 a motor 21 which may be of the fractional horsepower type operable by alternating current supplied by suitable leads, not shown, connected through fitting 22 to a power source located externally with respect to the housing 11. The switch 15 opens and closes the motor 21 connection, not shown, with a source of current.

The abrasive wheel 18 is shown in FIG. 1 connected directly to the shaft 23 of the motor 21 by suitable hub elements designated generally as numeral 24. In the practice of the invention either a flint or a carborundum wheel with a grit of 60 to 100 has been found suitable. The speed at which the wheel 18 is rotated for best results should be approximately 3,000 surface feet per minute. Of course, the speed of the rotation of the wheel 18 will be determined by the composition and the abrasive character of the wheel 18. Of course, any driving connection between the motor shaft 23 and the wheel 18 may be adopted; for example, a pulley and belt linkage, reduction gearing, etc., so long as the wheel 18 is drivable at a rate of speed sufficient to produce sparks with an intensity strong enough to activate a light or heat sensitive device when a bar of steel is contacted by the wheel 18.

Referring to FIGS. 1 and 3, along an axis extending from the vertical diameter of the wheel 18 and in a common vertical plane with the wheel 18, is a holder designated generally as numeral 25 having a tubular sleeve 26 threaded externally and receivable into an aperture 27 in the top 28 of the housing 11. The holder 25 is fastened rigidly to the top 28 of the housing 11 by means of hexagonal nuts 29—29, or the like.

A weight 31, provided with a cylindrical shank 32 (FIG. 3), slidably insertable into the sleeve 26, enables a constant pressure to be applied against the upper ends of bars of steel, such as the steel bar 33, placed within the sleeve 26 in contacting tangential engagement with the wheel 18.

Stationed through the side 34 of housing 11 adjacent the area of proposed contact of a steel bar sample with the abrasive wheel 18 is a sleeve fixture 35 for containing detachably therein a photocell 36 responsive to the intensity of light emitted by sparks of incandescent particles of steel torn from a steel sample by the abrasive action of wheel 18. The fixture 35 is attached through an aperture 37 of the side 34 in a manner similar to the attachment of the sample holder 25 to the top 28 of housing 11.

The photocell 36 may be of the conventional semiconductor type, such as the cadmium sulphide crystal, or any other type suitable for converting light energy into electrical energy. A commercially available crystal photocell identified as Clairex CL3, manufactured by the Clairex Corporation, 50 West 26th Street, New York, New York, has been found suitable for the practice of the present invention. The Clairex CL3 photocell is a cadmium selenide cell which differs in behavior from a cadmium sulphide cell principally with regard to spectral response. The Clairex CL3 photocell is also sensitive to infrared. Leads 38—38 are used to couple the photocell 36 with the electrical meter 13 directly or through suitable amplifiers such that any energy developed by the photocell 36 is recorded visually on the meter 13. Thus connected, the intensity of light caused by sparks from a steel sample is electrically noted on the meter 13.

The circuitry pertaining to the photocell 36 is shown in FIG. 4 wherein the meter 13 is depicted connected to a source of direct current such as battery 39. Coupled in series arrangement between the meter 13 and the battery 39 is the photocell 36, indicated in FIG. 4 as a cadmium sulphide cell, for example.

The battery 39, shown diagrammatically in FIG. 4, may be actually a number of batteries 39—39, as shown in FIGS. 1 and 2, which are located beneath chassis 16 arranged in suitable positions by battery brackets 41—41.

The operation of the instant device is as follows. Samples of steel are fashioned into similar size and configuration for reception into the holder 25. After slidably loading a sample bar of steel into the holder 25, the shank 32 of the weight 31 is inserted slidably into the sleeve 26 so as to bring pressure to bear against the sample in a direction toward the abrasive wheel 18. Next, the switch 15 is closed to activate the motor 21 and to rotate the wheel 18 which grinds the sample steel bar 33 to create sparks. The light intensity of the sparks arising by the abrasive action of the wheel 18 against the sample of steel 33 stimulates the photocell 36 to produce an amount of electrical energy measurable on the meter 13. By means of comparison of the quantity of energy registered on the meter 13 with a base quantity of energy for a known quality of steel, the sample under test is identified. The lamp 14 is used to indicate when the motor is in "on" position.

It should be understood, of course, that the above described embodiment of the invention is merely illustrative and that numerous modifications may be made within the spirit and scope of the invention. Further, it will be understood that the particular material illustrated is only an example of one type of material which may be tested in practicing the invention, and that the invention is not limited to use with this one type of material being used.

The term "light," as employed throughout the specification, is meant to include the visible as well as the invisible portions of the light spectrum, such as untraviolet and infrared, and the sensing device utilized in the particular embodiment disclosed is sensitive to infrared waves in addition to the light waves of shorter length.

What is claimed is:

1. A test set which comprises abrasive means, a sample holder designed to position a test sample in contacting engagement with the abrasive means whereby particles of the sample are abraded from the surface of the test sample, a photocell positioned in proximity to the abrasive means near the area of contact thereof with the sample for sensing the light intensity of the particles abraded from the surface of the test sample, and a meter coupled electrically to the photocell for indicating visually the light intensity of the particles sensed by the photocell.

2. A method of analyzing a steel sample which comprises abrading the steel sample to create luminary particles, sensing the light intensity of luminescence of the steel particles, and measuring the sensed light intensity of luminescence to determine the composition of the sample.

3. In an apparatus for determining the composition of a steel test piece, a housing having a top and a side wall joined thereto, a grinding wheel, means for mounting said grinding wheel for rotation within the housing in a vertical plane parallel to said side wall, a first sleeve mounted in said top in the plane of said wheel for receiving a test piece, means for urging said test piece to project from said first sleeve into engagement with the periphery of said wheel, means for rotating said wheel in a predetermined direction to produce a stream of sparks from said test piece, a second sleeve mounted in said side wall in advance of the point of engagement of said test piece with said rotating grinding wheel, said second sleeve being also positioned normal to said stream of sparks, a meter calibrated to indicate the composition of said test piece, and a photocell mounted within said second sleeve for actuating said meter in accordance with the light intensity of the stream of sparks.

References Cited in the file of this patent
UNITED STATES PATENTS

| | | |
|---|---|---|
| 895,980 | Derihon | Aug. 11, 1908 |
| 1,914,322 | Bickley | June 13, 1933 |
| 2,483,882 | Cooper | Oct. 4, 1949 |
| 2,588,368 | Edgerton | Mar. 11, 1952 |

OTHER REFERENCES

Bureau of Standards Research, Paper No. 605, Oct. 1933, pages 527–530 and FIGS. 1–6. (Copy in 73–15.)